US005562956A

United States Patent [19]

White, Jr.

[11] Patent Number: 5,562,956

[45] Date of Patent: Oct. 8, 1996

[54] WOOD CHIPPING AND DYEING PROCESSES AND PRODUCTS THEREOF

[76] Inventor: Haves R. White, Jr., 1809 Preston, Ennis, Tex. 75119

[21] Appl. No.: 473,291

[22] Filed: Jun. 7, 1995

[51] Int. Cl.[6] .............................. B27M 1/00; A01N 3/00

[52] U.S. Cl. .............................. 428/17; 144/30; 144/329; 144/363; 144/364; 144/367; 144/369; 144/380; 144/3.1; 144/138; 144/136.1; 144/162.1; 144/245.2; 427/212; 428/24

[58] Field of Search .............................. 47/9; 144/1 R, 144/2 R, 3 R, 30, 41, 162 R, 136 R, 329, 363, 364, 367, 369, 380, 245 R, 245 A; 427/212, 220, 372.2; 428/17, 21, 24, 106

[56] References Cited

U.S. PATENT DOCUMENTS

| | | | |
|---|---|---|---|
| 847,669 | 3/1907 | Levi | 428/17 |
| 2,599,647 | 6/1952 | La Marque | 428/24 X |
| 2,639,533 | 5/1953 | Casals | 29/428 |
| 4,460,532 | 7/1984 | Cornell | 144/30 |
| 4,971,125 | 11/1990 | Rule . | |
| 5,105,577 | 4/1992 | Hedges | 47/9 |
| 5,358,738 | 10/1994 | Sawka | 427/220 |

OTHER PUBLICATIONS

Hodge Boiler Works, Inc., Hodge Quick Opening Doors (For Autoclaves, etc.)1–4 (unknown).

Unknown Author, Untitled description of drill press operation for making colored wood chips 1–13 (unknown).

*Primary Examiner*—W. Donald Bray

*Attorney, Agent, or Firm*—Crutsinger & Booth

[57] ABSTRACT

Processes are provided for producing wood chips with a variety of cross sections such as those resembling botanical leaves and other decorative designs. The processes also produces wood chips that have coloration and shading. A rough form of wood having a elongated length is extruded lengthwise to make an extrusion having a decorative cross section. The extrusion is then cut at an angle to the direction of the elongated length of the extrusion into a plurality of wood chips having the desired cross-section. The step of cutting the extrusion involves positioning a lengthwise end of the extrusion adjacent at least one cutting blade oriented at an angle in the range of about 15 degrees to about 75 degrees relative to the elongated length of the extrusion, providing a relative rotational movement between the extrusion and the blade about the longitudinal center of gravity of the extrusion, and providing a relative linear movement between the extrusion and the blade in the elongated direction towards one another. Thus, the extrusion is cut in a generally helical manner to produce wood chips with a desired thickness. The process optionally includes the step of wetting the wood extrusion prior to the cutting step. The wetting fluid optionally includes a coloring agent for dying the wood extrusion to produce colored wood chips. Controlling the pressure can be used to control the extent to which the wetting fluid or coloring agent is distributed through the cross section of the extrusion.

38 Claims, 5 Drawing Sheets

WOOD CHIPPING AND DYEING PROCESSES AND PRODUCTS THEREOF

FIELD OF THE INVENTION

This invention relates to processes for producing wood chips. More particularly, it relates to processes for repeatably and efficiently producing wood chips with a decorative cross section. According to another aspect of the invention, it relates to processes for producing wood chips that have decorative coloring and shading.

BACKGROUND OF THE INVENTION

Wood chips are often used in products such as potpourri for mass and to carry color and aroma or perfume. Currently no product simulated leaves, botanical forms, or other designed symbols. Wood chips for artificial potpourri are typically manufactured by a drill press process. According to the drill press process, a relatively thin piece of wood, usually a plank a few inches thick, is manually positioned on a drill press beneath the drill bit, and the bit is manually lowered with a lever arm into the wood to drill a hole and thus produce wood shavings. After the hole is drilled, the lever arm is raised to raise the drill bit, the wood is manually repositioned in the drill press apparatus, and the bit is lowered again to drill another hole. This manual-labor intensive process is repeated until the piece of wood is substantially exhausted. The holes are drilled close together as an attempt to minimize waste, but even so, a substantial portion of the plank cannot be used and becomes scrap waste. The exhausted piece of wood is replaced with a fresh piece of wood and the process is repeated.

This drill press process produces wood shavings having plainly circular edges. Thus, the process is limited in its ability to repeatably produce wood shavings having a decorative or unusual cross section. The wood shavings vary significantly in size. A substantial quantity of the shavings produced are too small to be used in products such as potpourri. Consequently, the shavings are manually sifted to separate useable material (wood chips) from unusable scrap material.

After sifting, the shavings are colored as desired, for example, by immersing them in a heated dye bath. This process typically yields shavings or chips having a single uniform color. The dyed chips are rinsed with hot water to assure color fastness and are placed on drying trays. The chips may be air dried, but are usually dried in heaters to speed up the drying step. After drying, the chips are bagged for shipment.

Thus, the drill-press process is labor intensive and time consuming, since the drill bit must be repeatably lowered and raised and because the wood must be repeatedly repositioned. The process also produces scrap material which must be manually separated from the useable wood chips by sifting. The process is very limited in its ability to repeatably produce wood chips having a desired cross section and multiple colors to simulate tree leaves and other botanical matter or designed symbols. The limitations on cross section and color especially limits the ability of the process to produce wood chips that realistically simulate various types of botanical matter or other symbols.

U.S. Pat. No. 5,358,738 issued to Craig S. Sawka on Oct. 25, 1994, discloses a method for painting wood chips. The method includes an auger type screw which transports the wood chips from a hopper to a collection bag. As the chips are transported, they are simultaneously sprayed with paint.

Thus, there has been a long felt need for an efficient process for repeatably producing wood chips with a variety of cross sections, including those cross sections that resemble leaves and other botanical matter. And further, there has been a need for a process that produces wood chips that have single or multiple colors, shading., and hues The wood chips can be used in potpourri, for example, and they can be made to simulate botanical matter or a variety of other visually interesting objects.

SUMMARY OF THE INVENTION

According to the present invention, processes are provided for producing wood chips with a variety of cross sections such as those resembling leaves, other botanical matter, and graphic symbols or designs. The process also provides for making wood chips that have single or multiple colors and shading. The invention includes the wood chips produced by the processes of the invention.

A strip or rough form of wood having a elongated length is extruded lengthwise through a knife-blade former to form an extrusion having a desired cross section. The typical machines for this extrusion forming have common wood working names such as "spring shaper" and "moulder". The cross-section can be, for example, designed and shaped to generally resemble a star, a flower, a snow-flake, a heart, or other decorative or geometrical design. The cross section is designed to be approximately the same as the desired cross section of the wood chips which are ultimately produced from the extrusion. The extrusion has an inherent longitudinal center of gravity extending perpendicularly through the cross-section, which for a symmetrical cross-section design is located substantially along the geometric axis of the cross-section.

The extrusion is then cut at an angle to the direction of the elongated length of the extrusion into a plurality of wood chips having the desired cross-section. The step of cutting the extrusion includes the steps of positioning one lengthwise end of the extrusion adjacent at least one cutting blade oriented at an angle in the range of about 15 degrees to about 75 degrees relative to the elongated length of the extrusion, providing a relative rotational movement between the extrusion and the blade about the longitudinal center of gravity of the extrusion, and providing a relative linear movement between the extrusion and the blade in the elongated direction towards one another. Thus, the relative rotational movement between the extrusion and the blade and the relative movement of the extrusion and the blade in the elongated lengthwise direction toward one another cuts the lengthwise end portion of the extrusion in a helical manner to form a wood chip with a desired cross-section, thickness, and generally helical shape.

According to a preferred embodiment of the invention, the step of positioning one lengthwise end of the extrusion adjacent at least one cutting blade includes the step of positioning the lengthwise end adjacent at least two cutting blades, a first cutting blade oriented at an angle in the range of about 15 degrees to about 75 degrees relative to the length-wise direction of the extrusion and a second cutting blade oriented at an angle in the range of about 15 degrees to about 75 degrees relative to the lengthwise extrusion. The two cutting blades are positioned to substantially oppose one another in the cutting process. Depending on the relative positioning of the one, two, or more cutting blades, the cutting blades produce wood chips having a helical spiral of greater than 360 degrees (one blade), or about 360 degrees (two opposed blades), or less than 360 degrees (three or more blades).

According to another aspect of the invention, the process further includes the step of wetting the wood extrusion prior to the cutting step. The wetting step includes the step of soaking the extrusion in a wetting fluid to allow the fluid to be absorbed into the extrusion, which helps the cutting step. According to a further aspect of the invention, the step of soaking the extrusion includes the further step of controlling the pressure of the fluid to control the extent to which the wetting fluid is absorbed into the extrusion.

The wetting fluid optionally includes a coloring agent for dying the wood extrusion to produce colored wood chips. The step of controlling the pressure can be used to control the extent to which a coloring agent is distributed through the cross section of the extrusion. According to a further aspect of the invention, the step of wetting the extrusion includes repeating the step of immersing the extrusion in a different wetting fluid optionally having a different coloring agent, whereby the color penetration into the extrusion is sequentially controlled to produce wood chips having desired multi-colored cross-sections.

BRIEF DESCRIPTION OF THE DRAWING

The accompanying drawings, which are incorporated into and form a part of the specification, illustrate several embodiments of the present invention, and, together with the description, serve to explain the principles of the invention. The drawings are for the purpose of illustrating a preferred embodiment of the invention and are not to be construed as limiting the invention. The various advantages, features, steps, and uses of the present invention will be apparent from a consideration of the written description and the following drawings, in which.

DETAILED DESCRIPTION OF PREFERRED EMBODIMENTS

Figure 1:
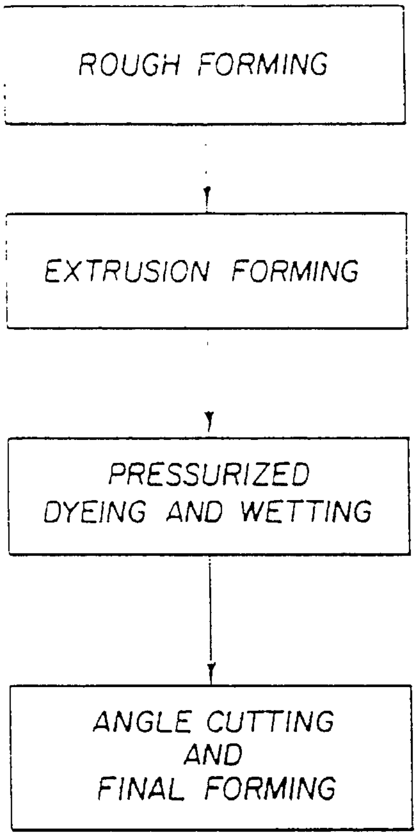
FIG. 1 is a flow chart describing the major steps of a process according to a preferred embodiment of the invention.

The major steps in a process according to the invention are summarized in the flow chart of FIG. 1.

According to the first step of the process, a length of wood is rough formed into one or more generally rectangular rough forms that are elongated in the grain direction.

Next, a rough form is extrusion formed to provide an extrusion with a decorative cross section, such as generally star-shaped, snowflake-shaped, clover-shaped, or heart-shaped.

A preferred embodiment of the invention includes an optional wetting step, which involves immersing the extrusion in a wetting fluid. It is believed that the wetting step reduces the wear and tear on the cutting blades and reduces the tendency of the wood chips to shatter during the cutting process. The wetting fluid optionally includes a coloring agent for dying the wood. Controlling the pressure of the fluid achieves a desired penetration of the wetting fluid and coloring agent.

The final step of the process is angle cutting the extrusions at an angle to the longitudinal center of gravity or elongated length of the extrusion, into a plurality of wood chips having the desired cross-section. According to a preferred embodiment, the step of cutting the extrusion includes the steps of positioning one lengthwise end of the extrusion adjacent at least one cutting blade oriented at an angle in the range of about 15 degrees to about 75 degrees relative to the elongated length of the extrusion, providing a relative rotational movement between the extrusion and the blade, and providing a relative linear movement between the extrusion and the blade along the elongated direction of the extrusion towards one another. This relative rotational movement produces a generally helical cutting action for generating wood chips as hereinafter described in more detail.

Figure 2:
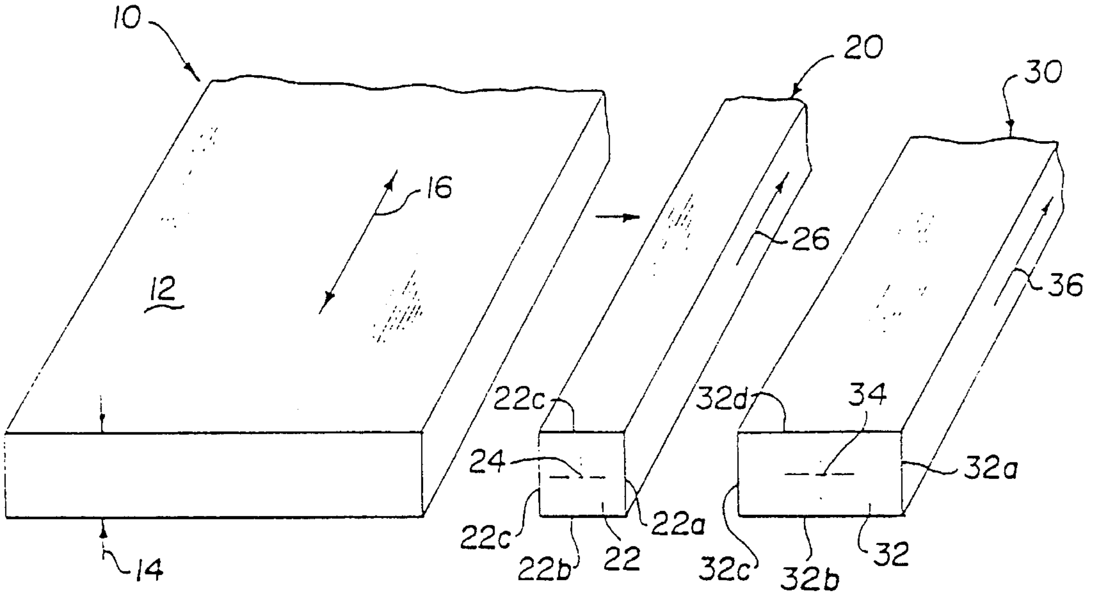
FIG. 2 illustrates the step of taking a relatively large piece of raw lumber and ripping it to provide square or rectangular rough forms that are elongated in the direction of the wood grain.

Referring now to FIG. 2 of the drawing, the step of rough forming a piece of wood, such as wood plank 10, into rough forms is illustrated. The wood plank 10 has a relatively large rectangular surface 12 and a thickness 14. The wood plank 10 preferably has a wood grain in the general direction indicated by arrow 16. The wood plank 10 can be, for example, a nominal two-by-six plank having a length in the wood grain direction of about six to eight feet. Thus, for such a wood plank 10, the rectangular surface would be nominally six inches by six or eight feet and the thickness 14 would be a nominal two inches. It is to be understood however, that the particular dimensions suggested in this description are merely representative of suitable dimensions that can be used and are not critical to the practice of the invention.

Any type of wood may be used, but a piece of kiln dried hardwood having an indirect division cellular structure and that is relatively soft for cutting purposes is preferred. An example of a suitable hardwood is poplar, but other hardwoods and most softwoods including pine or fir may also be used. The wood can be air dried instead of kiln dried, however, that process takes longer.

The wood plank 10 is ripped (e.g., cut with a rip saw) substantially along with the grain in the directions of arrow 16 to provide one or more square or rectangular rough forms that are elongated in the direction of the wood grain, such as rough forms 20 or 30, respectively. Typically, two or more rough forms 20 or 30 can be obtained from a wood plank 10. Rough forms 20 and 30 are elongated in the grain direction indicated by the direction of arrows 26 and 36, respectively. The size and shape of the cross section or profile of the rough forms will vary according to the desired size and cross section of the wood chips that are ultimately produced according to the process of the invention as hereinafter described. The profile or cross sections of the rough forms is typically a square 22 having sides 22*a*, 22*b*, 22*c*, and 22*d*, or a rectangle 32 having sides 32*a*, 32*b*, 32*c*, and 32*d*. The square rough form 20 has a longitudinal axis 24, which is also the longitudinal center of gravity. The rectangular rough form 30 has a longitudinal axis 34, which is also the longitudinal center of gravity. The size and shape of the rough form cross section is chosen to minimize the amount of wood wasted in subsequent steps of the procedure to produce a wood chips of a desired size and shape. Generally, square rough forms 20 are used to produce symmetrical wood chips, and rectangular rough forms 30 are used to produce non-symmetrical wood chips.

As used herein, the term "elongated" is intended to mean a length of at least two times the largest dimension of the profile or cross-section of the rough form, which is important for later providing the relative rotational movement between the extrusion and the cutting blade or blades. For example, a shorter length would be difficult to feed through a cutting machine or chucking machine as hereinafter described. Without intending to limit the invention, the rough forms 20 or 30, preferably have an elongated length up to any practical length, for example, up to several feet in the dimension indicated by arrows 26 or 36, respectively, for example, eight feet, and a square or rectangular cross-section having a largest dimension up to several inches, for example, in the range of about 1 to 3 inches.

According to the next major step of the process, the rough forms 20 or 30 are extruded one or more times through a plurality of shaping knives, for example a shaper or moulder, to create a decorative cross section, such as generally star-shaped, snowflake-shaped, clover-shaped, or heart-shaped. Referring to FIGS. 3, 4, 5, and 6 of the drawing, four such representative extrusions 40, 50, 60, and 70, respectively, are shown. The shape of the extrusion cross section dictates the cross-sectional appearance of the wood chips as hereinafter described in detail. The particular shape of the cross section is not critical to the practice of the invention, and other shapes are contemplated by the invention to produce decorative wood chips.

Figure 3:
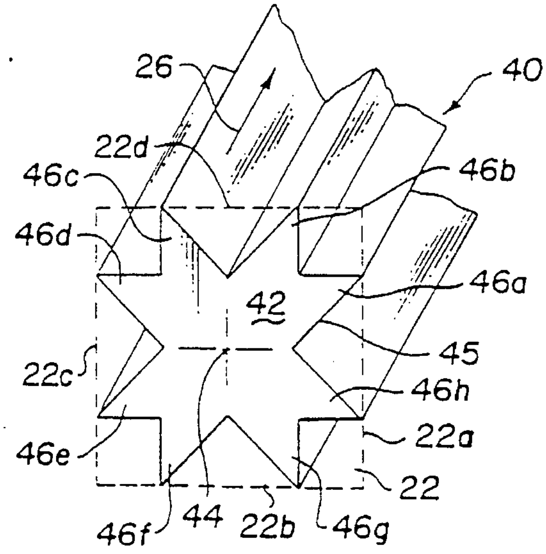
FIG. 3 illustrates an extruded wood strip having a generally star-shaped profile or cross section.

The extrusion step is best illustrated in FIG. 3, where the square cross section 22 of rough form 20 is indicated by a dashed outline having sides 22*a*–22*d* (which could also be lines 32*a*–32*d* of rectangular cross section 30 if desired). A multi-pointed star-shaped cross section 42 of extruded form 40 is indicated by a solid line 45, which defines a plurality of pointed segments 46*a*–h. During the extrusion process, the wooden material that lies outside solid line 45 defining the star-shaped cross section 42 is removed from the rough form 20. Each pointed segment 46*a*–*h* on cross section 42 is preferably extending to lie very close to or on one of the original lines 22*a*–22*d* to maximize use of the available cross section 22 while minimizing the amount of material that must be removed in the extrusion step. After forming the extrusion 40, it inherently has a longitudinal center of gravity along the elongated direction of extrusion, which is indicated by the reference numeral 44. In the case of the highly symmetrical cross section 42, the center of gravity 44 is substantially coincident with the longitudinal geometric axis of the extrusion 40. In the case of the extrusion 40, the longitudinal center of gravity 44 is substantially coincident with the original axis 24 of the rough form 20, however, as hereinafter explained, this may not be the case for other extrusion cross-sections.

A number of devices can be used to extrude the rough forms 20 and 30 into extrusions having the desired cross section. For example, as well known to those skilled in the art, the extrusion of rough forms can be performed with a planar, molder, shaper, or router. The preferred device or devices for forming the extrusion depends on the particular type of cross section desired. Many desirable cross sections can be produced using machines equipped with standard off-the-shelf knives or cutting heads, but custom made knives and cutting heads can be produced and used if necessary to achieve more specialized cross sections.

Figure 5:
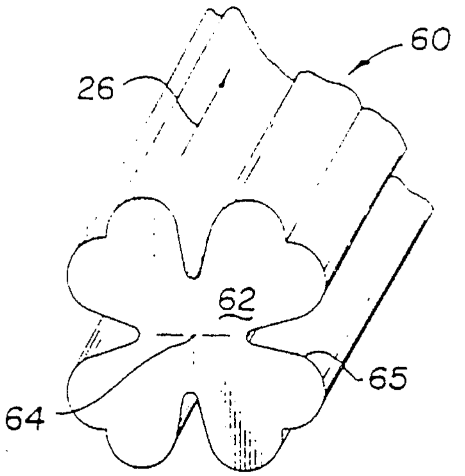
FIG. 5 illustrates an extruded wood strip having a generally clover-shaped profile or cross section.
Figure 6:
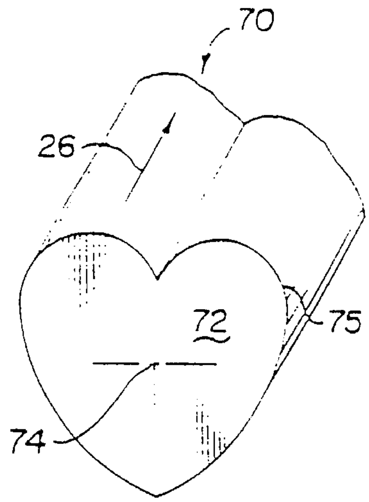
FIG. 6 illustrates an extruded wood strip having a generally heart-shaped profile or cross section.
Figure 4:
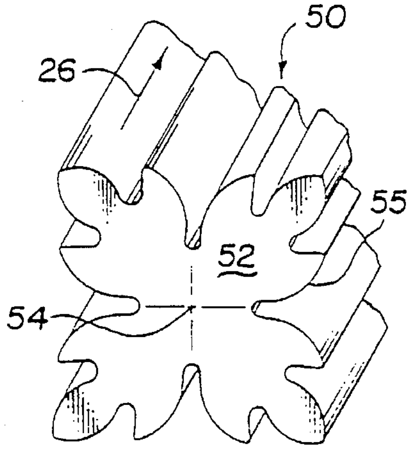
FIG. 4 illustrates an extruded wood strip having a generally snowflake-shaped profile or cross section.

Rough forms 20 or 30 can be extruded in the same or a similar manner as that used to produce extrusion 40 to produce other extrusions, such as those represented in FIGS. 4, 5, and 6.

Referring to FIG. 4, extrusion 50 has snowflake-like curved surfaces 55 defining a snowflake-like cross section 52. Extrusion 50 is preferably elongated in the grain direction of the original rough form 20, for example, as represented by directional arrow 26. Extrusion 50 inherently has a longitudinal center of gravity along the elongated direction of extrusion, which is indicated by the reference numeral 54.

Turning to FIG. 5, extrusion 60 has clover-like curved surfaces 65 defining a four-leaf-clover-shaped cross section 62. Extrusion 60 is preferably elongated in the grain direction of the original rough form as represented by directional arrow 26. Extrusion 60 inherently has a longitudinal center of gravity along the elongated direction of extrusion, which is indicated by the reference numeral 64.

Referring now to FIG. 6, extrusion 70 has broadly curved surfaces 75 defining a heart-shaped cross section 72. Extrusion 70 is preferably elongated in the wood grain direction of the original rough form as represented by directional arrow 26. Extrusion 70 inherently has a longitudinal center of gravity along the elongated direction of extrusion, which is indicated by the reference numeral 74. Again, in this case the center of gravity 74 is substantially coincident with the longitudinal geometric axis of the extrusion 70. However, because of the different geometrical symmetry of the heart-shape, the longitudinal center of gravity 74 is located in a different position than the original axis of a rough form.

The cross sections 42, 52, 62, and 72 of the extrusions 40, 50, 60, and 70, shown in FIGS. 3–6, respectively, represent three general types of desirable cross sections which may be produced with the method: geometrical (star-shaped); symbolic (heart-shaped and clover-shaped); and botanical (leaf shaped). Each extrusion is preferably formed in a manner that maximizes the use of the available cross section 22 or 32 of rough forms 20 or 30, as the case may be.

According to a presently most preferred embodiment of the invention, the process optionally includes the step of dying and wetting the extrusions prior to the step of angle cutting and final forming. It is to be understood, however, that the invention can be practiced without the step of dying and wetting.

The extrusions, such as one or more of any type of extrusion 40, 50, 60, or 70, are treated in a fluid bath to give them a desired wetness prior to cutting the extrusions into wood chips as hereinafter described in detail. A fluid container of any suitable configuration is filled with wetting fluid, typically water. For example, it can be desirable to distribute a wetting fluid such as water through the cross section of the extrusion, because angle cutting the extrusion while wet provides wood chips with a superior finish than cutting the extrusion while dry. The fluid may also contain one or more wetting agents and/or detergents to facilitate absorption of the wetting fluid into the wood. Such wetting agents and/or detergents are well known in the art, and include, for example, "NP-9" surfactant, which is a trade designation for a surfactant commercially available from Robert Koch Industries, Bennett, Colo.

The wetting fluid optionally has a coloring agent, eg. a dye or mixture of dyes, dissolved therein for imparting a desired color to the wood extrusions. For the purposes of this disclosure, the term color is used in its conventional sense (red, orange, yellow, green, blue and any mixtures or hues thereof).

In a wetting step, the extrusions are immersed in the wetting fluid for a sufficient period of time for the fluid to absorb into the wood and distribute a color across at least a portion of the cross section of the extrusion. The sufficient time will depend on such factors as the type of wood used to make the extrusions, the dimensions of the extrusions, and the extent of wetting penetration desired. The fluid soaks into the wood from the outer surfaces and moves through the material toward the center of the extrusion. Since the extrusions are typically elongated in the direction of the grain, the wetting fluid tends to move through the wood toward the center inwardly across the wood grain through the cross section of the extrusion.

According to a presently most preferred embodiment of the invention, the pressure of the fluid is controlled to facilitate and control the extent to which fluid is absorbed into the cross section. For example, the step of wetting the extrusions is preferably performed in a pressure vessel such as an autoclave. The pressure inside the autoclave is increased or decreased, changing the rate at which the wetting fluid is absorbed through the cross section of the extrusion. A higher pressure increases the rate of absorption, whereas a lower pressure decreases the rate of absorption relative to the rate of absorption at normal atmospheric pressure, all else being equal. If desired, the temperature is also controlled; a higher temperature increases the rate of absorption, whereas a lower temperature decreases the rate of absorption relative to the rate of absorption at room temperature, all else being equal.

An autoclave can be operated at practically any reasonably desired pressure, but according to the presently preferred embodiment it is typically operated at pressures ranging from about 60 psi to about 200 psi. Lower pressures are less effective at forcing the wetting fluid fully into the interior of the extrusion's cross section, and higher pressures may shatter the wood. Pressures ranging from about 125 to about 150 psi are the most preferred.

The extrusion is removed from the fluid container after it has been immersed and preferably pressurized for a period of time sufficient to achieve the desired distribution of wetting fluid and optional coloring agent within the cross section of the extrusion.

The immersion period, the pressure and length of time for which pressure is applied, the specific wetting agent, and the specific coloring agent employed may all be varied to produce a variety of desired coloring affects. For example, a long immersion period coupled with high pressure and the liberal use of wetting agents may yield a cross section which is completely and evenly colored. A short immersion period at lower pressure may yield a cross section where only the outer portions of the cross section is colored by the coloring agent in the wetting fluid.

Multi-colored cross sections may be achieved by repeating the foregoing steps using different wetting fluids, each having a different coloring agent. The extrusion is immersed and pressurized in a first wetting fluid having a first coloring agent dissolved therein for a period of time and at a sufficient pressure for the fluid to extend completely into the central portion of cross section. The extrusion is then immersed in a second wetting fluid containing a second coloring agent dissolved therein for a period of time and at a sufficient pressure for the fluid to absorb partially into the wood, for example, about half-way toward the center. The result is a multicolored cross section, where the innermost portion is one color and outer peripheral portion is another color.

The immersion and pressurizing steps may be repeated any number of times under various conditions controlling the wetting fluid, wetting agents, coloring agents, pressure, time, and temperature to achieve a variety of coloring affects.

The next step of the process is angle cutting the extrusions at an angle to the grain direction, into a plurality of wood chips having the desired cross-section. According to a preferred embodiment, the step of cutting the extrusion includes the steps of positioning one lengthwise end of the extrusion adjacent at least one cutting blade oriented at an angle in the range of about 15 degrees to about 75 degrees relative to the elongated length of the extrusion, providing a relative rotational movement between the extrusion and the blade, and providing a relative linear movement between the extrusion and the blade along the elongated direction of the extrusion towards one another. This relative rotational movement produces a generally helical cutting action for generating wood chips as hereinafter described in more detail. According to a further and most preferred embodiment of the invention, the process includes the further step of automatically feeding a plurality of extrusions one after another through one or more cutting blades to make wood chips.

Figure 7:
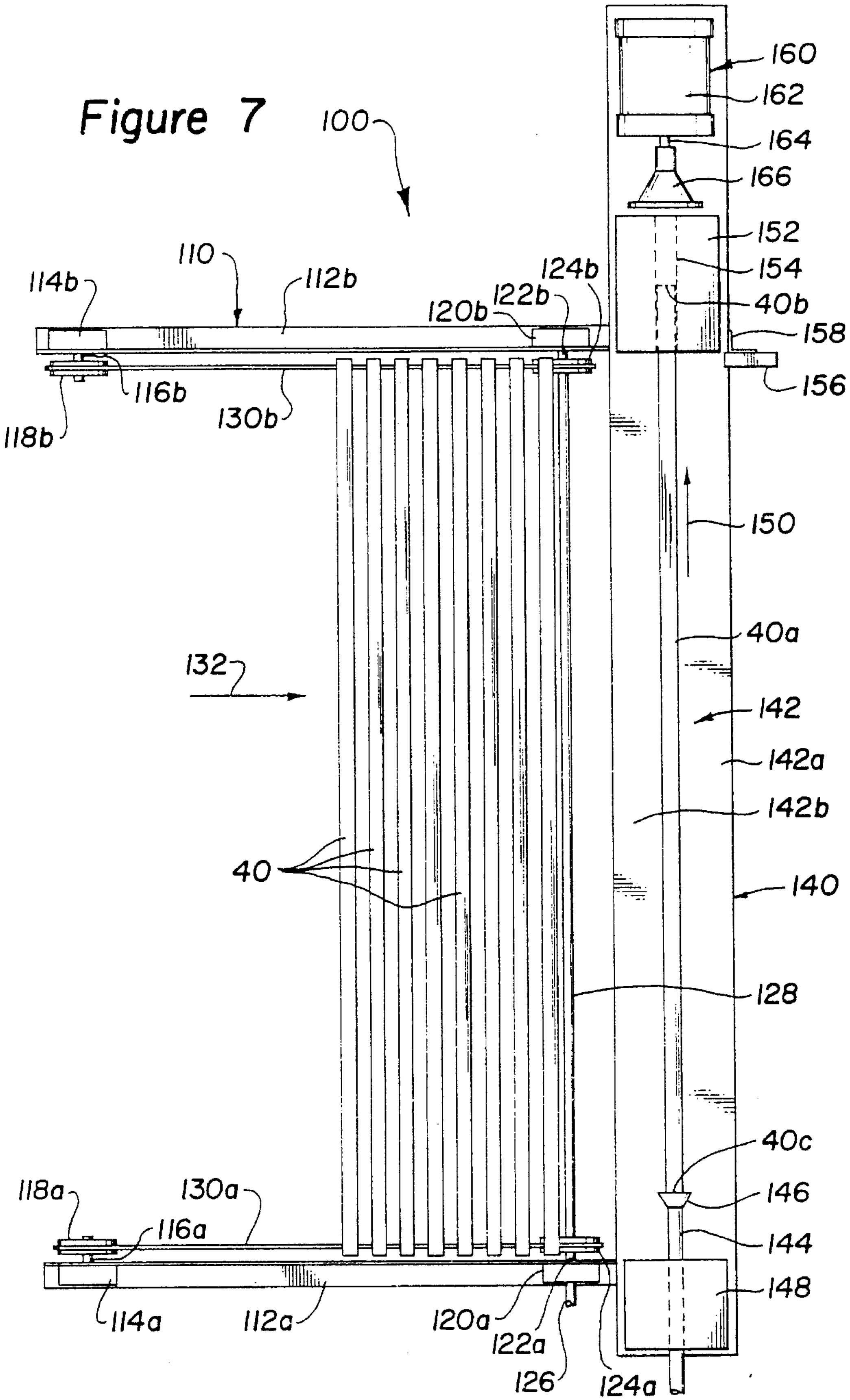
FIG. 7 illustrates an apparatus according to one preferred embodiment of the invention, the apparatus for sequentially feeding wood strips through a cutting device to cut the extrusion into wood chips.

Referring now to FIG. 7 of the drawing, an apparatus, which is generally referred to by the reference numeral 100 is provided for performing the cutting step of the process. In general, the apparatus includes a conveyor 110, a feeder 140, and a chucking machine 160. A plurality of extrusions, represented by extrusions 40 are loaded onto the conveyor 110. The conveyor advances the extrusions 40, one after another, into the feeder 140. The feeder 140 continuously forces an extrusion, designated extrusion **40*a*, lengthwise through the chucking machine 160** to continuously produce wood chips.

The conveyor 110 of the apparatus 100 includes a pair of side supports **112*a* and 112*b*, which are parallel and spaced apart from each other. A pair of idler roller mounts 114*a* and 114*b* are supported by the side supports 112*a* and 112*b*, respectively. Idler roller mounts 114*a* and 114*b* support idler shafts 116*a* and 116*b*, respectively, to which idler rollers 118*a* and 118*b*, respectively, are mounted. Idler rollers 118*a* and 118*b* are mounted to rotate freely. A pair of drive roller mounts 120*a* and 120*b* also are supported by the side supports 112*a* and 112*b*, respectively. Drive roller mounts 120*a* and 120*b* support drive shafts 122*a* and 122*b*, respectively, to which drive rollers 124*a* and 124*b* are mounted. A motor shaft 126 is operably connected to drive shaft 122*a*, and drive shaft 122*a* is operably connected to drive shaft 122*b* by connecting shaft 128. Motor shaft 126 selectively and simultaneously drives drive shaft 122*a*, connecting shaft 128, and drive shaft 122*b***.

The idler rollers **118*a* and 118*b* and the drive rollers 124*a* and 124*b* support a pair of conveyor chains 130*a* and 130*b*, respectively. The conveyor chains 130***a* and 130*b* are preferably supported in a substantially horizontal position for supporting a plurality of extrusions, represented by extrusions 40. The conveyor chains 130*a* and 130*b* have small tabs or spacers for positioning the plurality of extrusions 40 on the chains at evenly spaced-apart distances from one another.

When motor shaft 126 is rotated, it causes drive rollers 124*a* and 124*b* to rotate, thereby simultaneously advancing the pair of chains 130*a* and 130*b*. The motor shaft 126 is provided with a selectively operable motor for advancing the chains 130*a* and 130*b* such that the extrusions 40 are moved in the direction of arrow 132 an incremental amount for delivering one of the plurality of extrusions 40 to the feeder 140 upon demand as hereinafter explained in more detail.

When an extrusion, such as representative extrusion 40*a* is moved to the feeder 140 of the apparatus 110, it is centered in a trough-like channel 142, which preferably has two downward sloping surfaces 142*a* and 142*b* defining a generally V-shaped trough. Extrusion 40*a* is shown in the channel 142, with first end 40*b* positioned near the chucking machine 160 and the opposed end 40*c* positioned adjacent a push rod 144.

The push rod 144 has a cup-shaped end 146 adapted to engage the end 40*c* of the extrusion 40*a*. Push rod 144 is preferably mounted to a drive box 148 for reciprocating the push rod 144 toward the chucking machine 160 along the feeding direction indicated by arrow 150. When the drive box 148 advances the push rod 144, the extrusion 40*a* is pushed into a power feeder 152, which pulls the extrusion 40*a* through the chucking machine 160. The power feeder 152 helps align the extrusion 40*a* for feeding into the chucking machine 160 and prevents the extrusion from rotating while it is being cut by the chucking machine. For this purpose, the power feeder 152 preferably has an elongated aperture 154 therein which is sized slightly larger than the extrusion cross section.

An electric eye device 156 is preferably mounted with a suitable bracket 158 or otherwise adjacent the power feeder 152 for detecting the absence of any more length of extrusion 40*a* extending into the power feeder 152. When the electric eye device 156 detects the absence any obstruction, i.e., any remaining length of extrusion 40*a* extending into the power feeder 152, it sends a signal that causes the drive box 148 to reciprocate the push rod back to a first position such that the cup-shaped end 146 is adjacent the drive box. The electric eye device also signals a selectively operable drive motor to turn the motor shaft 126 sufficiently to advance the next extrusion 40 on the conveyor 110 to the feeder 140. The drive box 148 then drives the push rod 144 to feed the end of the next extrusion 40 into the power feeder 152, which in turn pulls the extrusion through the chucking machine 160.

The chucking machine 160 of the apparatus 100 includes a drive motor 162, a chuck mounting shaft 164, and a chucking head 166.

Figure 8:
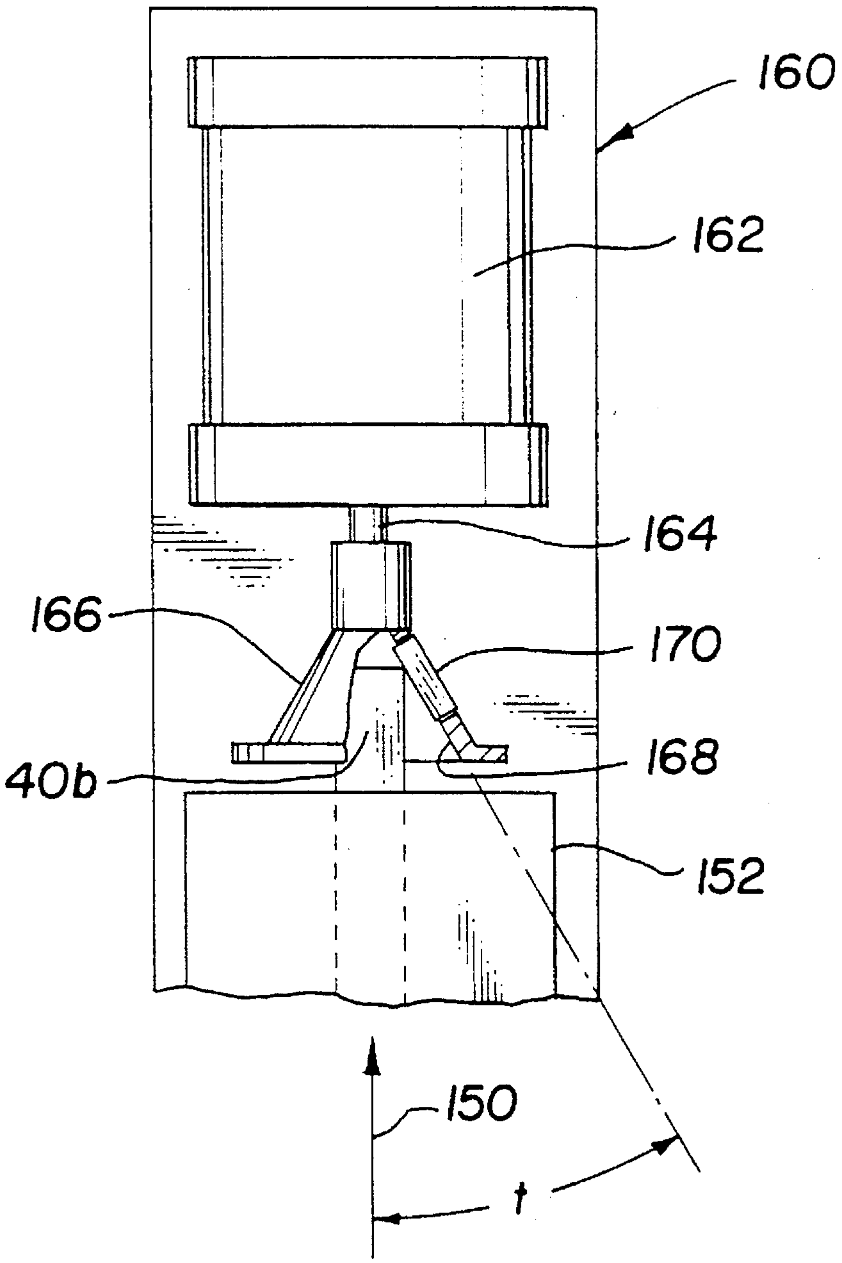
FIG. 8 is an enlarged partial fragmentary view of the cutting device showing the relationship of a cutting blade to the lengthwise grain direction of a wood strip.

Turning to FIG. 8 of the drawing, the chucking machine 160 is shown in more detail. The drive motor 162 of the chucking machine 160 is preferably a variable speed motor. The chuck mounting shaft 164 is preferably adapted for mounting any one of a number of different sized and structured chucking heads 166 for angle cutting to achieve the desired wood chips. The drive motor 162 rotates the chuck mounting shaft 164 about the axis of the shaft.

The chucking head 166 has a generally cone-shaped opening 168 adapted to receive the end 40*b* of an extrusion that is pushed toward the head in the direction indicated by arrow 150. The chucking head 166 has at least one blade 170 mounted therein for cutting the end 40*b* of an extrusion.

The chucking machines 160 and related chucking heads are typically used in the prior art to shape the end of a fencepost into a point. One end of a post is fed into the cutting head and is progressively trimmed to the desired shape until the post reaches a mechanical stop, whereupon the extrusion is removed from the head. Chucking machines and chucking heads for makings stakes, dowel pointers, and pointing heads are well known in the art and are commercially available, for example, from the Bignell Machine Company, 516 7th Street, N.W., Grand Rapids Mich.

When such a conventional machine is used in the present invention, any mechanical stop on the chucking head is removed to allow the entire length of the extrusion to be continuously fed through the cutting head, whereby the entire length of an elongated extrusion can be continuously fed through the chucking head for the purpose of making decorative wood chips as herein described. These types of commercially available chucking heads are modified according to the invention to remove the stop, and the machine is preferably incorporated into an automatic feeding and chucking apparatus 100. However, it is to be understood that according to the invention a modified chucking machine can be manually fed an extrusion.

The blade 170 mounted in the chucking head is oriented at an angle "t" with respect to the direction indicated by arrow 150, which is also preferably the direction of the wood grain of the extrusion. Any angle t in the range of about 15 degrees to about 75 degrees with respect to the direction 150 is suitable. Positioning the blade 170 at an angle of about 75 degrees to the grain direction 150 produces wood chips with a cross section nearly identical to the cross section of the extrusion, but that still have some helical shape. Positioning the blade 170 at an angle of about 45 degrees (diagonal) to the grain direction 150 produces wood chips with a well defined helical shape that provides a three-dimensional appearance to the wood chip. A blade positioned from about 30 degrees to about 60 degrees have been found to be the most effective at producing wood chips with a superior finish and decorative appearance.

The chucking machine 160 may use single or multiple blades 170. A single, diagonally oriented blade 170 is used to produce a chip having a helical cross section which exceeds 360 degrees. Two blades are used to make a chip having a helical cross section of about 360 degrees. When using two blades, the second blade is preferably positioned on the cone-shaped opening 168 of the chucking head 166 at about 180 degrees around the opening to substantially oppose the first blade 170. More than two blades are used to make a chip having a helical cross section of less than about 360 degrees. When using three or more blades, the blades are preferably positioned to be equally spaced around the cone-shaped opening 168 of the chucking head 166.

Referring briefly back to FIG. 7, the continuous feeding action of the power feeder 152 feeds extrusion 40*a* into the cutting path of at least one blade mounted on the chucking head 166 while the blade is rotating, thus allowing the blade to contact the edge of end 40*b* of the extrusion to helically cut off an end shaving and form a wood chip.

Alternatively, the same helical cutting effect may be achieved by rotating the extrusion while maintaining a cutting blade in a stationary position. The feed rate (the speed at which the extrusion is moved towards the blade) and the speed of the blade are controlled to slice off end portions with a thickness corresponding to the desired thickness of the resulting wood chips. This process is repeated or continued until a plurality of wood chips are produced.

Figure 9:
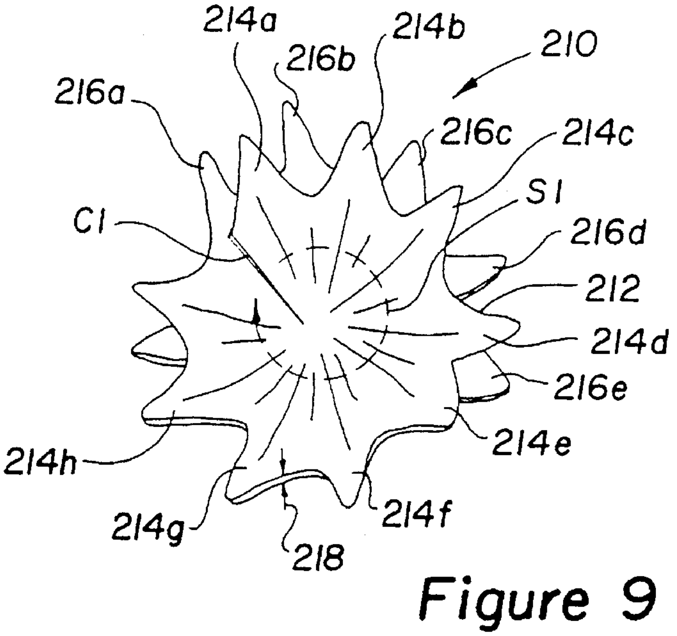
FIG. 9 illustrates an example of a realistic wood chip obtained by cutting the wood strip shown in FIG. 3 of the drawing with a cutting head having one cutting blade.
Figure 10:
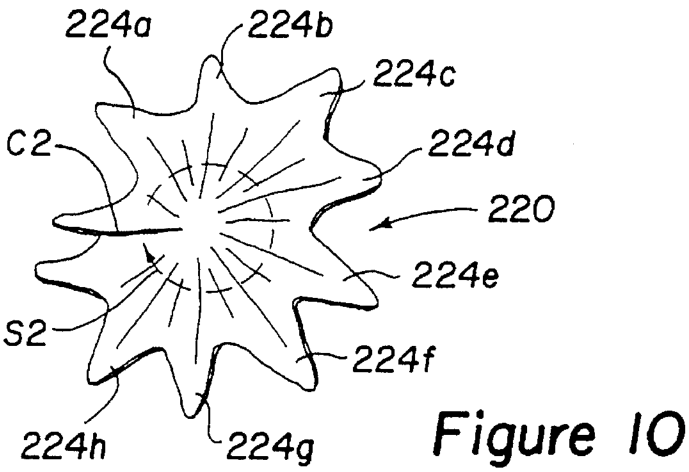
FIG. 10 illustrates an example of a realistic wood chips obtained by cutting the wood strip shown in FIG. 3 of the drawing with a cutting head having two cutting blades.
Figure 11:
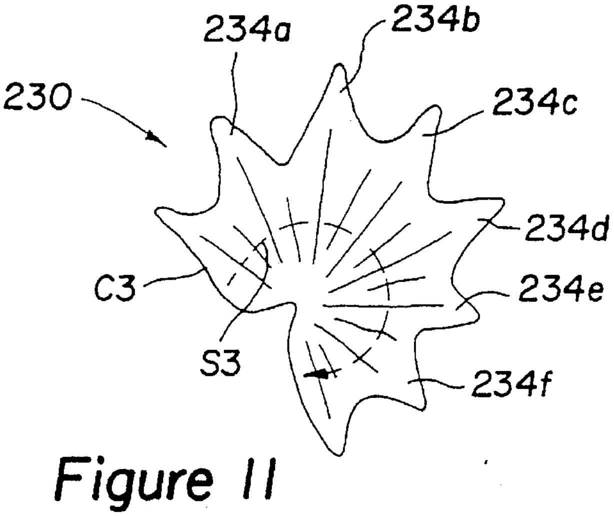
FIG. 11 illustrates an example of a realistic wood chips obtained by cutting the wood strip shown in FIG. 3 of the drawing with a cutting head having at least three cutting blades.

Examples of wood chips produced according to the preferred processes of the invention are illustrated in FIGS. 9, 10, and 11 of the drawing.

Referring to FIG. 9, a first wood chip, which is generally referred to by the reference numeral 210 is illustrated. The wood chip 210 is produced according to a process wherein the extrusion is formed to have a generally multi-pointed star-shaped cross section substantially as shown in FIG. 3 of the drawing. As can be seen by comparing FIG. 9 to FIG. 3, the star points 214*a–h* of the wood chip 210 roughly correspond to the pointed segments 46*a–h* of the extrusion 40 shown in FIG. 3. The wood chip is cut to have any desired thickness 218, but is usually thin, for example, on the order of 1/100 of an inch (10 mil). Wood chip 210 is a helically spiraled wood chip have more than a 360 degree spiral, starting at first cut line C1 as indicated by the dashed line S1, which results from a process using an angle cutting step employing a single cutting blade. The helical spiral stops whenever a natural or stress break occurs in the cutting of the wood chip. As can be seen, beyond the first complete spiral, some of the star points produced from the continuation of the helical cutting can be seen extending from underneath the first spiral, such as points 216*a–e*.

Referring to FIG. 10 of the drawing, a second wood chip is illustrated, which is generally referred to by the reference numeral 220. The wood chip 220 is produced with the same generally multi-pointed star-shaped cross section substantially as shown in FIG. 3 of the drawing. As can be seen by comparing FIG. 10 to FIG. 3, the star points 224*a*–h of the wood chip 220 correspond to the pointed segments 46*a–h* of the extrusion 40 shown in FIG. 3. However, wood chip 220 is a helically spiraled wood chip having about a 360 degree spiral, starting at first cut line C3 as indicated by the dashed line S2, which results from a process using an angle cutting step employing two opposing blades.

Finally, referring to FIG. 11 of the drawing, a third wood chip is illustrated, which is generally referred to by the reference numeral 230. Again, wood chip 230 is produced with the same generally multi-pointed star-shaped cross section substantially as shown in FIG. 3 of the drawing. As can be seen by comparing FIG. 10 to FIG. 3, the star points 234*a–f* of the wood chip 230 correspond to the pointed segments 46*a–f*, for example, of the extrusion 40 shown in FIG. 3. However, wood chip 230 is a helically spiraled wood chip having about a 180 degree spiral, starting at first cut line C3 as indicated by the dashed line S3, which results from a process using an angle cutting step employing three equally spaced-apart blades.

Although wood chips shown in FIGS. 9, 10, and 11 simulate a tree leaf, it is to be understood that wood chips can be made to have other decorative shapes, for example, by feeding extrusions such as those shown in FIGS. 4, 5, or 6 of the drawing through the chucking machine.

The extrusions can be cut after drying, but wet cutting is preferred. The term wet cutting, as used herein, means cutting the wood before it has dried to a normal moisture content of approximately 10–20 percent by weight based on ASTM D 2016. Wood chips produced by wet cutting exhibit a superior finish when compared with those that are produced by dry cuts. When the extrusion is cut wet, the wood chips are dried afterward to a normal moisture content. The chips are preferably kiln dried. Alternatively, the wood chips may be air dried for approximately seven days.

Although the invention has been described with reference to these preferred embodiments, other embodiments can achieve the same results. Variations and modifications of the present invention will be apparent to those skilled in the art without departing from the scope and spirit of the invention, and it is intended to cover in the appended claims all such modifications and equivalents.

What is claimed is:

1. A process of forming wood chips having a decorative shape and at an at least partially spiralling cross section, the process comprising the steps of:

removing material from a strip of wood to form an extrusion that is elongated, has a longitudinal center of gravity, and has at least one end;

positioning at least one blade at an angle in the range of about 15 to about 75 degrees with respect to longitudinal center of gravity of the extrusion;

providing relative rotational movement between the extrusion and the blade about the longitudinal center of gravity of the extrusion; and providing relative linear movement between the extrusion and the blade along the longitudinal center of gravity of the extrusion so that the blade engages the end of the extrusion;

whereby the blade engages the extrusion to shave wood chips from the extrusion.

2. The wood chips produced by the process of claim 1.

3. A process according to claim 1, wherein the step of providing relative rotational movement between the extrusion and the blade about the longitudinal center of gravity of the extrusion comprises: providing a relative rotational movement that is eccentric to the longitudinal center of gravity of the extrusion.

4. A process according to claim 1, wherein the step of providing relative rotational movement between the extrusion and the blade about the longitudinal center of gravity of the extrusion comprises the step of: rotating the blade about the longitudinal center of gravity of the extrusion.

5. A process according to claim 4, wherein the step of providing relative linear movement between the extrusion and the blade along the longitudinal center of gravity of the extrusion comprises the step of: moving the extrusion along its center of gravity towards the blade.

6. A process according to claim 5, wherein the step of positioning at least one blade at an angle in the range of about 15 to about 75 degrees with respect to the longitudinal center of gravity of the extrusion comprises: positioning the blade at an angle of about 30 degrees to about 60 degrees with respect to the longitudinal center of gravity.

7. The wood chips produced by the process of claim 6.

8. A process according to claim 6, wherein the step of positioning at least one blade at an angle in the range of about 15 to about 75 degrees with respect to longitudinal center of gravity of the extrusion comprises: positioning a single blade, whereby wood chips are produced having a cross section with greater than 360 degree spiral.

9. The wood chips produced by the process of claim 8.

10. A process according to claim 6, wherein the step of positioning at least one blade at an angle in the range of about 15 to about 75 degrees with respect to longitudinal center of gravity of the extrusion comprises: positioning two blades at about 180 degrees opposed to one another about the center of gravity of the extrusion, whereby wood chips are produced having a cross section of about 360 degrees spiral.

11. The wood chips produced by the process of claim 10.

12. A process according to claim 6, wherein the step of positioning at least one blade at an angle in the range of about 15 to about 75 degrees with respect to longitudinal center of gravity of the extrusion comprises: positioning at least three blades equally spaced apart about the center of gravity of the extrusion, whereby wood chips are produced having a cross section of less than 360 degrees spiral.

13. The wood chips produced by the process of claim 12.

14. A process according to claim 1, additionally comprising the step of: wetting the extrusion prior to cutting wood chips from the extrusion with a wetting fluid for a sufficient period of time for the wetting fluid to be distributed into at least a portion of a cross section of the extrusion.

15. A process according to claim 14, additionally comprising the step of adding at least one wetting agent to the wetting fluid.

16. A process according to claim 14, additionally comprising the step of adding a coloring agent to the wetting fluid.

17. The wood chips produced by the process of claim 16.

18. A process according to claim 16, further comprising the step of: controlling the pressure of the wetting fluid during the wetting step.

19. A process according to claim 18, wherein the step of controlling the pressure of the fluid during the wetting step comprises: the step of pressurizing the wetting fluid from about 60 psi to about 200 psi.

20. A process according to claim 18, wherein the step of controlling the pressure of the fluid during the wetting step comprises: the step of pressurizing the wetting fluid from about 125 psi to about 150 psi.

21. The wood chips produced by the process of claim 20.

22. A process according to claim 16, additionally comprising the step of wetting the extrusion at least one additional time with a wetting fluid having at least one different coloring agent therein, the additional wetting step being for a sufficient time for the different coloring agent to be absorbed into at least part of the cross section.

23. The wood chips produced by the process of claim 22.

24. A process of forming wood chips having a decorative cross section and color comprising the steps of:

removing material from a strip of wood to form an elongated extrusion that has a longitudinal center of gravity and at least one end;

wetting the extrusion with a wetting fluid for a sufficient period of time for the wetting fluid to be distributed into at least a portion of the cross section;

positioning at least one blade at an angle in the range of about 15 to about 75 degrees with respect to longitudinal center of gravity of the extrusion;

providing relative rotational movement between the extrusion and the blade about the longitudinal center of gravity of the extrusion; and providing relative linear movement between the extrusion and the blade along the longitudinal center of gravity of the extrusion so that the blade engages the end of the extrusion;

whereby the relative movements of the blade and extrusion causes the blade to engage the extrusion to shave wood chips from the extrusion.

25. The wood chips produced by the process of claim 24.

26. A process according to claim 24, wherein the step of providing relative rotational movement between the extrusion and the blade about the longitudinal center of gravity of the extrusion comprises the step of: rotating the blade about the longitudinal center of gravity of the extrusion.

27. A process according to claim 26, wherein the step of providing relative linear movement between the extrusion and the blade along the longitudinal center of gravity of the extrusion comprises the step of: moving the extrusion along its center of gravity towards the blade.

28. A process according to claim 27, wherein the step of positioning at least one blade at an angle in the range of about 15 to about 75 degrees with respect to the longitudinal center of gravity of the extrusion comprises: positioning the blade at an angle of about 30 degrees to about 60 degrees with respect to the longitudinal center of gravity.

29. The wood chips produced by the process of claim 28.

30. A process according to claim 28, wherein the step of positioning at least one blade at an angle in the range of about 15 to about 75 degrees with respect to longitudinal center of gravity of the extrusion comprises: positioning a single blade, whereby wood chips are produced having a cross section with greater than 360 degree spiral.

31. The wood chips produced by the process of claim 30.

32. A process according to claim 28, wherein the step of positioning at least one blade at an angle in the range of about 15 to about 75 degrees with respect to longitudinal center of gravity of the extrusion comprises: positioning two blades at about 180 degrees opposed to one another about the center of gravity of the extrusion, whereby wood chips are produced having a cross section of about 360 degrees spiral.

33. The wood chips produced by the process of claim 32.

34. A process according to claim 28, wherein the step of positioning at least one blade at an angle in the range of about 15 to about 75 degrees with respect to longitudinal center of gravity of the extrusion comprises: positioning at least three blades equally spaced apart about the center of gravity of the extrusion, whereby wood chips are produced having a cross section of less than 360 degrees spiral.

35. The wood chips produced by the process of claim 34.

36. A process according to claim 25, including the step of controlling the pressure of the fluid.

37. A process according to claim 25, including the step of adding a coloring agent to the wetting fluid.

38. The wood chips produced by the process of claim 37.

* * * * *